United States Patent
Dayan et al.

(10) Patent No.: US 8,776,009 B2
(45) Date of Patent: Jul. 8, 2014

(54) METHOD AND SYSTEM FOR TASK MODELING OF MOBILE PHONE APPLICATIONS

(75) Inventors: Aviram Dayan, Beer-Sheva (IL); Meytal Tubi, Hadera (IL); David Mimran, Tel Aviv (IL); Bracha Shapira, Beer-Sheva (IL); Peretz Shoval, Omer (IL); Meira Levy, Kiryat Tivon (IL); Katja Henke, Berlin (DE); Gregor Glass, Berlin (DE); Lutz Schneider, Berlin (DE)

(73) Assignee: Deutsche Telekom AG, Bonn (DE)

( * ) Notice: Subject to any disclaimer, the term of this patent is extended or adjusted under 35 U.S.C. 154(b) by 676 days.

(21) Appl. No.: 12/720,835

(22) Filed: Mar. 10, 2010

(65) Prior Publication Data

US 2010/0235808 A1    Sep. 16, 2010

(30) Foreign Application Priority Data

Mar. 12, 2009   (IL) .......................................... 197576

(51) Int. Cl.
*G06F 9/44* (2006.01)
*G06F 17/00* (2006.01)
*G06F 17/30* (2006.01)

(52) U.S. Cl.
USPC ........... 717/104; 717/101; 717/102; 717/105; 707/602; 707/708

(58) Field of Classification Search
None
See application file for complete search history.

(56) References Cited

U.S. PATENT DOCUMENTS

| | | | |
|---|---|---|---|
| 7,139,999 B2* | 11/2006 | Bowman-Amuah | 717/101 |
| 7,392,162 B1* | 6/2008 | Srinivasan et al. | 703/2 |
| 7,424,701 B2* | 9/2008 | Kendall et al. | 717/105 |
| 7,941,438 B2* | 5/2011 | Molina-Moreno et al. | 707/756 |
| 7,949,629 B2* | 5/2011 | Pollara | 707/602 |
| 8,418,125 B2* | 4/2013 | Hawkins et al. | 717/104 |
| 2002/0104068 A1* | 8/2002 | Barrett et al. | 717/104 |
| 2003/0097363 A1* | 5/2003 | Dorsey | 707/100 |
| 2004/0103071 A1* | 5/2004 | Kalia et al. | 706/26 |
| 2005/0028133 A1* | 2/2005 | Ananth et al. | 717/105 |

(Continued)

OTHER PUBLICATIONS

Francois Bodart et al., "A Model-Based Approch to Presentation: A Continuum from Task Analysis to Prototype", [Online], Jun. 1994, pp. 1-16, [Retrieved from Internet on Mar. 19, 2014], <http://citeseerx.ist.psu.edu/viewdoc/download?doi=10.1.1.30.8424&rep=rep1&type=pdf>.*

(Continued)

*Primary Examiner* — Thuy Dao
*Assistant Examiner* — Ziaul A Chowdhury
(74) *Attorney, Agent, or Firm* — Roach Brown McCarthy & Gruber, P.C.; Kevin D. McCarthy (57) ABSTRACT

A system for task modeling interactive sequential applications for one or more mobile devices has a software tool for defining a generic meta-model of the target applications. The generic meta-model has a static model of application components, and a dynamic model of identifiers of application screens and connections; a passive Task Model database for storing the generic meta-model for future reuse, which further comprises static instances of the generic meta-model specifically generated for a variety of mobile devices; a tracker module for real-time monitoring and creating unique identifier for each application's screen visited by the user of the mobile device, wherein created identifiers are used for generating active models of the user actual use; and an active Task Model database for storing the active models, wherein data transferring and storing is minimized to screen identifier numbers.

15 Claims, 3 Drawing Sheets

(56) References Cited

U.S. PATENT DOCUMENTS

| | | | |
|---|---|---|---|
| 2005/0160397 A1* | 7/2005 | Szpak et al. | 717/104 |
| 2006/0015478 A1* | 1/2006 | Beringer et al. | 707/2 |
| 2006/0149582 A1* | 7/2006 | Hawkins | 705/1 |
| 2006/0200794 A1* | 9/2006 | Robertson et al. | 717/103 |
| 2006/0294226 A1* | 12/2006 | Goulden et al. | 709/224 |
| 2007/0150300 A1* | 6/2007 | Fukazawa et al. | 705/1 |
| 2007/0162324 A1* | 7/2007 | Suzuki et al. | 705/9 |
| 2007/0214042 A1* | 9/2007 | Dominowska | 705/14 |
| 2007/0282581 A1* | 12/2007 | Mangino et al. | 703/6 |
| 2008/0077580 A1* | 3/2008 | Ozveren et al. | 707/5 |
| 2008/0275910 A1* | 11/2008 | Molina-Moreno et al. | 707/103 R |
| 2009/0006444 A1* | 1/2009 | Bhatt et al. | 707/102 |
| 2009/0013306 A1* | 1/2009 | Elaasar et al. | 717/105 |
| 2009/0031226 A1* | 1/2009 | Zhang et al. | 715/762 |
| 2009/0249281 A1* | 10/2009 | Fritzsche et al. | 717/104 |
| 2010/0153473 A1* | 6/2010 | Gopalan | 707/810 |
| 2010/0169299 A1* | 7/2010 | Pollara | 707/708 |
| 2011/0023009 A1* | 1/2011 | Brunswig et al. | 717/104 |
| 2012/0102451 A1* | 4/2012 | Kulkarni et al. | 717/102 |

OTHER PUBLICATIONS

Jacob Eisenstein et al., "Adapting to Mobile Contexts with User-Interface Modeling", [Online], IEEE 2000, pp. 1-10, [Retrieved from Internet on Mar. 19, 2014], <http://www.ximl.org/documents/XIMLMobile.pdf>.*

Giulio Mori et al., "Design and Development of Multidevice User Interfaces through Multiple Logical Descriptions", [Online], IEEE—2004, pp. 507-520, [Retrieved from Internet on Mar. 19, 2014], <http://ieeexplore.ieee.org/stamp/stamp.jsp?tp=&arnumber=1316868>.*

Geoff Coulson et al., "A Generic Component Model for Building Systems Software", [Online], ACM Feb. 2008, pp. 1-29, [Retrieved from Internet on Mar. 19, 2014], <http://delivery.acm.org/10.1145/1330000/1328672/a1 -coulson.pdf>.*

Paterno, F.: Model-Based Design and Evaluation of Interactive Applications. Springer Verlag, Winter 2000—12 pages.

Mori, G.; Paterno, F.; Santoro. C.: CTTE: Support for Developing and Analyzing Task Models for Interactive System Design, IEEE Transactions on Software Engineering, vol. 28 (8), 2002—17 pages.

* cited by examiner

METHOD AND SYSTEM FOR TASK MODELING OF MOBILE PHONE APPLICATIONS

FIELD OF THE INVENTION

The present invention relates to the field of analyzing user interaction with interactive application. More particularly, the invention relates to a method and system for modeling, tracking and analyzing interactive sequential applications for Smart Mobile (SMOB) devices.

BACKGROUND OF THE INVENTION

In recent years the number and variety of the applications supported by digital devices has significantly increased. In addition to the need of customers for new stimulating applications, operators and service providers share a strong desire that customers will exploit the applications provided to them. The profit of operators and service providers is directly proportional to the frequency of using their applications. Thus, a drop in usage generally results in a drop in profits.

The quality of an application is often determined by the customer's use of it. Typically, the quality of an application is evaluated in terms of how well it is designed, if it is free of defects, and how long-lasting it remains in use by customers. While these are critical components for the evaluation of quality, it is important to realize that if a customer considers a product as difficult to use or not "friendly", he will most likely not use it enough to find out how well it is designed, or to explore all the options that it provides. A term which is often used to describe the quality of a product from the user's perspective, particularly with respect to computer products, is the term "user friendly".

When the user invokes an application on a digital device, he usually has a task in mind that he wishes to complete—for example, sending an Instant Message or adding a contact to the phone contact list. In order to perform such tasks, the user interactively goes through a series of screens until the task is completed. Every screen consists of elements—some of which are Screen Input Elements (SIE) which are used for data input and advancing the user to other screens, while others are Screen Elements (SE) which are presented on the screen (i.e. without input). The entire group of elements presented on the user's device is referred to hereinafter as User Interface Elements (UIE).

Service providers are interested in realizing their customers' activities for providing better services to existing applications and for developing new applications that better fit their customers' needs. Generally, a Task Model (TM) is a logical description of all the UIE, namely, all the screens that may be presented to the user, and all the activities that may be performed by users of interactive applications who are wishing to achieve certain goals. The TM serves as an infrastructure for understanding the application domain, supporting effective design and requirements' analysis of interactive applications, enabling usability evaluation and identifying task efficiency. In the more developed systems the TM supports the user in real time, namely, during his interaction with the system.

There are several conventional methods for generating TM for an application. PaternÒ (PaternÒ, F.: Model-Based Design and Evaluation of Interactive Applications, Springer Verlag, 1999) presents a TM specification notation which enables reusable task structures to be defined at both low and high semantic levels. Another tool that provides support for developing and analyzing task models for interactive system design presented by Mori, Paterno, and Santoro (Mori, G.; Paterno, F.; Santoro. C.: CTTE: Support for Developing and Analyzing Task Models for Interactive System Design, IEEE Transactions on Software Engineering, Vol. 28 (8), 2002). This tool supports the Unified Modelling Language (UML- which is a standardized modelling language that includes a set of graphical notation techniques to create visual models of software-intensive systems) design notation by representing elements and operators of a task model by an existing UML notation, developing automatic converters from UML to task models, and building a new UML for interactive systems.

However, the methods described above have not yet provided satisfactory solutions to problems typical to applications running on SMOB devices, Applications running on technologically advanced devices such as SMOB devices are generally complex applications with diverse usage patterns that require low and high level definitions that the former TM methods could not provide. Former TM methods have some inheritance capabilities, but they are lacking partial inheritance and inheritance in different layers of the TM, which TM for complex applications, such as for the SMOB requires. Those TM further require the option of partial inheritance. Another disadvantage of the methods described above is the inability to match the TM with the actual, real-time user-system interaction. Those TM's have no mechanism for recording the physical presentation of the applications, and therefore, can not match it to the TM generated.

It is therefore an object of the present invention to provide a method and apparatus for modeling, tracking and analyzing interactive applications for smart mobile (SMOB) devices.

It is an object of the present invention to provide a system and method for modeling mobile applications by a human modeler.

It is an object of the present invention to provide a method for monitoring and collecting data from currently visible running applications.

It is another object of the present invention to provide a method for collecting and transferring data at a minimal communication load.

It is yet another object of the present invention to provide a method and system for service providers to realize their customers' activities.

It is an object of the present invention to provide a method and system for identifying user intentions and usability problems while performing tasks in interactive software application.

It is yet another object of the present invention to provide an easy maintenance of the TM, considering future modeling of applications, versions and platforms.

It is yet another object of the present invention to provide a method for improving the services provided to users by simplifying their interactions with the system.

Other objects and advantages of the invention will become apparent as the description proceeds.

SUMMARY OF THE INVENTION

The present invention is directed to a system for task modeling interactive sequential applications for one or more mobile devices such as SMOB phones, which comprises:

a. a software tool for defining a generic meta-model of the target applications, wherein the generic meta-model consist of a static model of application components, and a dynamic model of IDs of application screens and connections;

b. a passive TM database for storing the generic meta-model for future reuse, which further comprises static instances of the generic meta-model specifically generated for a variety of mobile devices;

c. a tracker module for real-time monitoring and creating unique ID for each application's screen visited by the user of the mobile device, wherein created IDs are used for generating active models of the user actual use; and d. an active TM database for storing the active models, wherein data transferring and storing is minimized to screen ID numbers.

The screen ID number may be the screen signature. The mobile device may further comprise a real-time recommender engine, for offering the client real-time help, marketing and content determined by the provider. The real-time recommendation may be based on the tracked data and relevant passive TMs downloaded to the mobile device.

The system may further comprise an analyzer that receives data from both passive and active databases and compares the databases for generating an output database. The output database may comprise the usage patterns, error patterns, user's intention prediction, market trends, and usability problems, in addition to graphs and reports for helping providers realizing customers' activities and behavior.

The present invention is also directed to a method for modeling interactive sequential applications for smart devices, which comprises the steps of:

a. generating a static model describing all goals of target applications using their screens, SIEs, transitions between screens, sub-goals and the links between them;

b. building a dynamic model based on the static model by tracking the use of the application screens over an actual device;

c. creating instances of the static and dynamic models specifically generated for a variety of devices;

d. storing the static and dynamic models with their instances into a passive TM database;

e. downloading relevant passive TMs to client's device according its type and the application supported by it;

f. tracking in real-time clients' activities and generating a unique ID for each screen that is captured; and g. storing the tracked model into an active TM database, The screen ID may be verified before storing in active TM database for validating the tracking. Real-time help, marketing and content determined by the provider, based on the tracked data and relevant passive TMs downloaded to client's device may be offered the client.

Data may be analyzed by comparing the passive and active databases, for generating an output database comprises usage patterns, error patterns, user's intention prediction, market trends, and usability hotspots (problems) in addition to graphs and reports for helping providers realizing customers' activities and behavior. The static and dynamic models may be in the form of an Entity Relationship Diagram (ERD), and implemented in a relational database.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention provides a tool for modeling mobile device applications. The system enables a modeler to create generic Task Models (TMs) for those applications. The method proposed by the present invention enables service providers to store the generated TMs in the memory of each client's mobile phone, or in a central server. Realizing customers' activities is done by tracking in real-time (during the user-system interaction) users actions and sending the tracked sequences to a "smart" analyzer. The method proposed by the present invention allows service providers to analyze their customers' activities.

Figure 1:
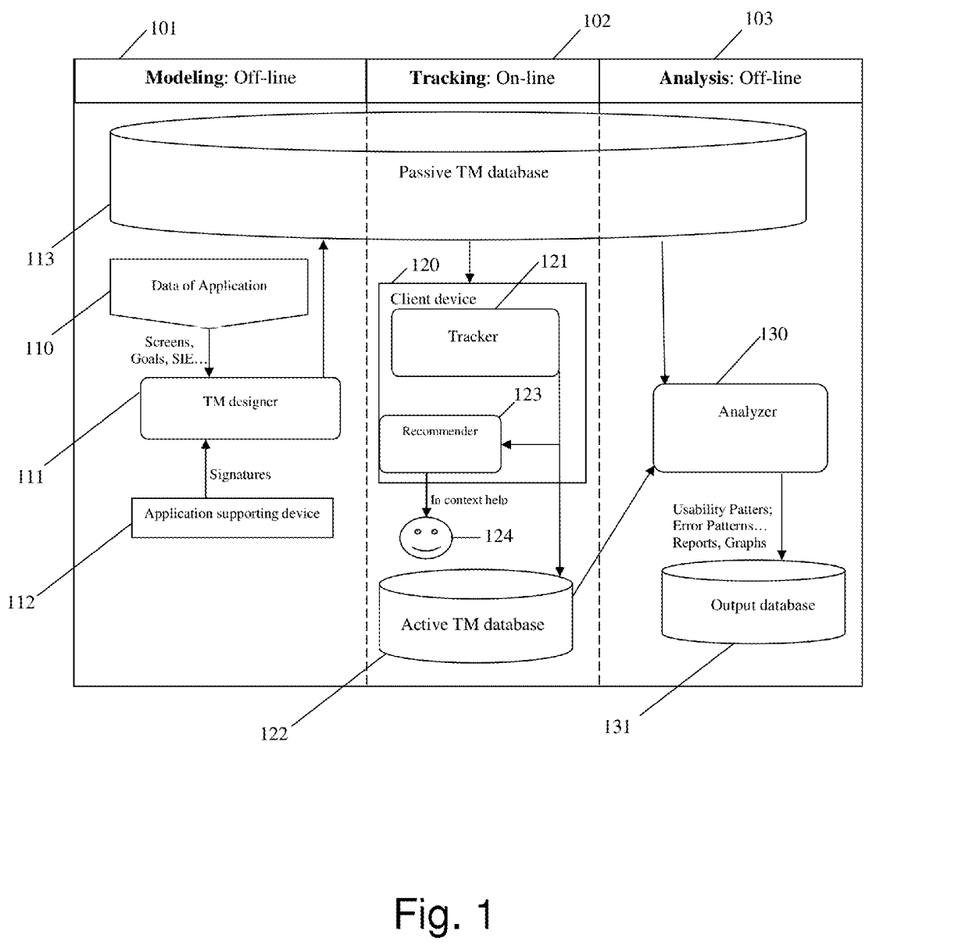
FIG. 1 is a block diagram of the system for modeling, tracking and analyzing interactive sequential applications.

The screen ID captured by the tracker is matched to the screen ID from the task modeling stage, that was downloaded to the device. The verified screen ID is sent to the active TM database 122. Verifying the screen signature enables validation of the tracking. Using screen IDs provides minimal communication load (data transfers and storing are minimal—only the ID numbers) and cross platform support. Besides tracking the client's actions, the client's device further comprises a real-time Recommender engine 123 which offers real-time help, marketing and other content determined by the provider. The recommender engine is based on the screens that the user is visiting, his behavior, and relevant passive TMs, downloaded to client's device. The signatures of the screens are mapped by the tracker to the task model so that the recommender engine receives the ID of the screens that the user visits. The tracked data is sent to the recommender engine within the client application that maintains a rule engine that matches the help format and ads (announcements of new application) to the context of the user, as learned from the tracked data. For example, if the user does not complete some goal (inferred from comparing the passive and active TMs), he receives on his screen an icon offering help or tutorial that may explain to him how to fulfill this goal, thus simplifying user interaction with the system. The tracked data is also sent to the analyzing stage 103.

FIG. 1 is a block diagram of the system for modeling, tracking and analyzing interactive sequential application, according to the invention. The system operation is divided to three main stages: modeling 101, tracking 102, and analyzing 103. The modeling phase consists of modeling the data of an application 110 by a human modeler, using the new developed TM Designer tool 111. The modeler defines all the data of the application (i.e. screens, SIE, UIE, goals, etc) with their connections in a way that allows saving (i.e. arrays, tree structures, directed graphs, etc). In addition, unique screen identification (ID) is automatically captured from the device 112 supporting the application. According to one embodiment, the unique screen identification is a screen signature. Screen signature represents the physical items of the screen and the screen's state within the device's application. Capturing screen signature may be utilized but not limited to one of the methods presented in Israeli patent applications Nos, 203970 and 203971. The modeling stage is done off-line. The output of the modeling stage is the passive TM database 113. The passive TM database includes definitions of each of the applications, their goals, tasks, screens and possible transitions between them. Generally, the passive TM represents the available/possible usage scenarios of each of the applications. The passive TM database is stored and manipulated using a relational Database Management System (DBMS). The tracking stage occurs in real-time, when the client 124 operates his device. The relevant passive TM is first downloaded to the client's device according to the application's goals supported by the device and device type. A tracker module 121 within the device records the clients' activities, captures the user's screens, and SIEs for generating the active TM. The tracker generates a unique ID for each screen that it captures, namely, every screen presented to the client. The screen ID is generated in the same manner as the ID in the modeling stage, hence, by choosing an ID that matches the screen's signature. According to the embodiment described in the modeling stage, the ID used in the tracking stage is also a screen signature. Capturing the screen ID at each step performed by the user allows monitoring and collecting data from currently visible running applications.

The analyzing stage is customized by the provider and comprises the analyzer module 130. In this stage, the analyzer uses both the passive 113 and active 122 TM databases and identifies usage patterns, error patterns, user's intention prediction, usability hotspots, cumbersome flows, and more. By comparing the active TM to the passive TM the analyzer generates an output database 131. The output database comprises the analyzed client's behavior, namely usage patterns, error patterns, user's intention prediction, market trends, and usability hotspots (problems), in addition to graphs and reports produced by the analyzer for helping providers to realize their customers' activities and behavior. Clients' behavior and usability problems, as presented in the graphs and reports are used by the service providers to simplifying users' interaction with their systems, thus improving the services provided to users.

The TM designer 111 (in FIG. 1) is a graphical software tool for generating passive TM of complex applications. The TM designer supports two representations of the TM: the first is a meta-model, which represents and visualizes the TM. The second is a database representation, includes the meta-model static instance. The TM designer enables the modeler to define a meta-model for an application, validate it by checking that there are no contradictions in the schema and that all the required attributes were properly defined, and then enables an expert user to create a static instance of the meta-model. The architecture of the TM designer consists of three layers:

Model layer—this layer defines the metadata of the model and the graphical definitions. The TM designer uses a graphical modeling framework that automatically generates code for the graphics and the elements in the model. The elements in the model match the elements in the passive TM database.

Logic layer—this layer contains the code that supports extended features such as import and export. The import feature enables to utilize entities existing in databases of various diagrams without the need to redefine their attributes (e.g. the same goal can appear in different diagrams, where in each diagram a different screen is defined). The export feature enables to store a new defined and validated diagram.

Runtime environment layer—this layer contains the interface presented to a modeler of an application. The runtime environment provides the modeler tools to create a model using the elements of the application. The runtime environment enables reuse of existing models for easy maintenance of application and versions, and allows working in different orientations.

Figure 2:
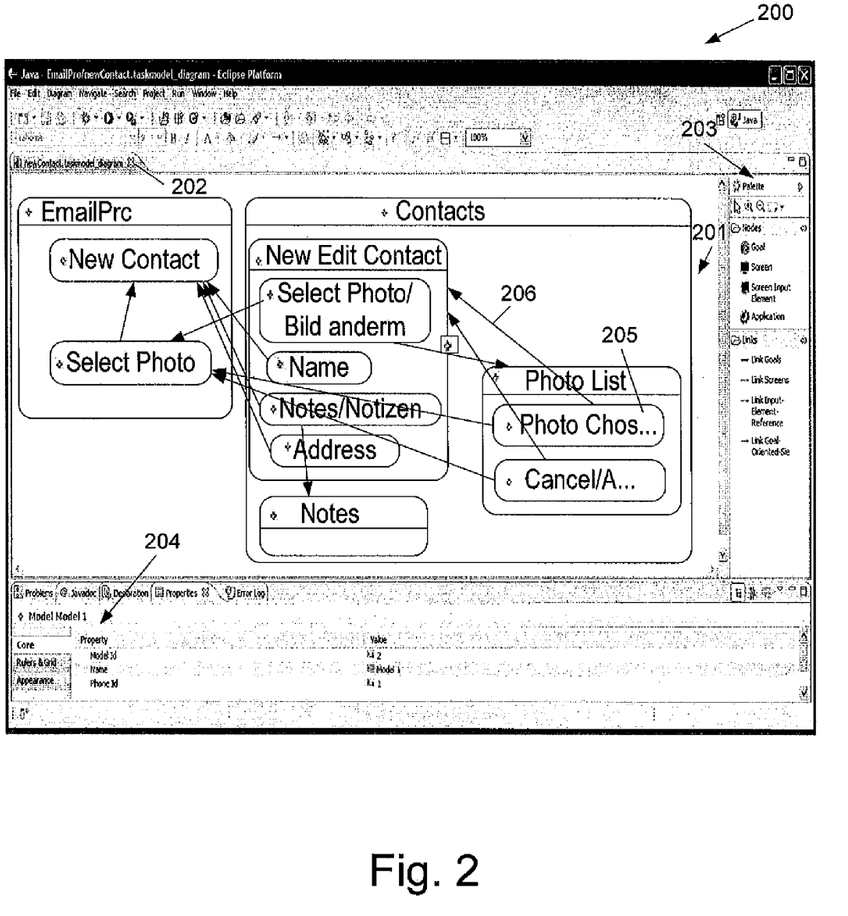
FIG. 2 is an example of a runtime environment for creating a TM diagram by the TM designer.

FIG. 2 is an example of a runtime environment 200 for creating a TM diagram 201 by the TM designer, according to the invention. The runtime environment includes three views. The first view is the canvas 202, which presents the current TM diagram 201 with the elements that are currently modeled (e.g. screens 205 and SIEs 206). The second view is the tool palette 203. This view enables dragging elements to the canvas for easily constructing the model. The elements are entities comprising data about the components of the application and possible transition between them. The third view is the properties view that presents the properties of the selected element in the canvas. The model is written into two files, one file represents the graphical data (diagram file 201) on the canvas, and the other file represents the structure of the model elements and their properties (model file 204), which can be exported to the passive TM DB.

The TM designer 111 in FIG. 1 enables working in different modeling perspectives. For example, task-oriented modeling, the main perspective in which all elements (nodes and links) are enabled. Another perspective is screens-oriented modeling, which is used to model concrete screens of the application with no respect to a specific goal. Another option is goals-oriented modeling, which is used to model associations between goals.

The task modeling enables easy maintenance of the model by the modeler of an application, considering future modeling of applications, versions and platforms. To cope with future changes, an inheritance mechanism is implemented where important entities of the task model, such as Screens and Applications, have a parent-child relationship. The inheritance mechanism defines types of screens and applications to reuse them with minor changes in different models, where the change is minor across versions of applications and phones. The inheritance mechanism is implemented (in several tables of the TM database) by means of a base-ID (in addition to a primary-key ID), which is the primary-key of the parent record/entity from which the current record inherits. Hence, each record has two keys: the primary-key, which is unique for each record, and a base-ID, which is its parent's ID. In case of a base record (parent), the base-ID field is identical to its primary-key, while in case of an inherited record the base-ID is the primary-key of the parent record. When the record inherits from a parent all the inherited fields have no values, assuming that their content is retrieved from the parent record. The child can override its parent's data by inserting new data to a corresponding field. This mechanism provides the ability to reuse screen/application/input definitions across models and applications.

The TM of each application included in a device is represented in various Relational database (DB) tables. Following is an example of a certain table entitled tasks (domains of attributes and other constraints are not defined for simplicity) stored in the passive TM DB:

Table Tasks:
ID Primary-key
Base-ID
Name
Application
Version

Following is an example for implementations of the inheritance mechanism in this table:
Record 1:
ID=1
Base-ID=1
Name="Add Contact"
Application="Contacts"
Version=1
Record 2:
ID=2

Base-ID=1
Name="Add Contact"
Application=NULL (Data inherited from record 1)
Version=1.2
Record 3:
ID=3
Base-ID=1
Name="Add Contact to Email"
Application=NULL (Data inherited from record 1)
Version=NULL (Data inherited from record 1)

Figure 3:
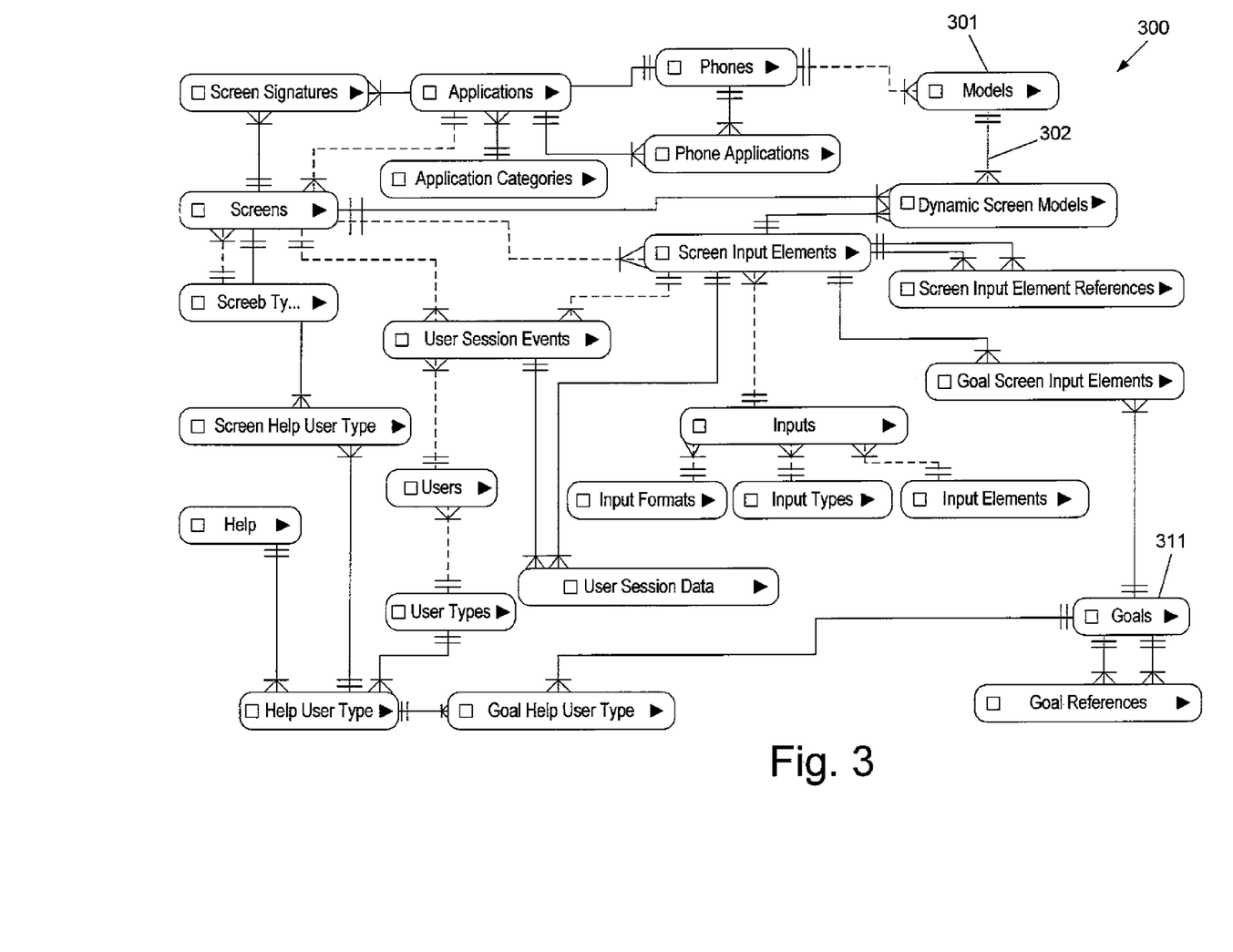
FIG. 3 illustrates a conceptual schema of the full TM (active a passive) in the form of an Entity Relationship Diagram (ERD).

FIG. 3 illustrates a conceptual schema of the generic TM 300 (active and passive) in the form of an Entity Relationship Diagram (ERD) for a SMOB phone. For the sake of brevity, it includes only the entity types (e.g. 301) and relationship types (e.g. 302). The schema includes definitions of both the passive TM, i.e. data about the components of the application (e.g. goals 311, screens, and tasks) and the possible transitions between these components; and the active TM, i.e. data about the user's actual use of the application at runtime. The TM has two perspectives. The first one is usage tracking, i.e., tracking the user activities for usage mining. For this purpose, the available application service usage scenarios are modeled, hence, technical low level modeling is performed. The second perspectives is goals tracking, i.e., tracking and realizing the user's goal for possible help suggestions. For this purpose, a conceptual structure of the application is modeled, hence, goals hierarchies and transitions between screens and goals are considered.

The generic TM includes entities for creating a model for an application. In one embodiment the generic TM is constructed from ERD entities for active and passive TMs. Following are examples of entities belonging to the active TM:

Phones—a specific telephone identifier; each phone is characterized by its operating system (e.g. Windows Mobile 6, Symbian s60).

Models each model identifies a TM for a specific phone with specific applications. This entity has a n:1 relationship with Phones.

Applications—commercial services on a smart phone. It includes the category to which the application belong (e.g. mail) and an executable field which is the specific name of the application executable to be monitored.

PhoneApplications—the applications that are installed on a specific phone. This entity represents a n:m relationship between Phones and Applications.

ScreenTypes—e.g. System, Help and Application.

Screens—the user interfaces within applications while operating the phone. This entity has n:1 relationships with ScreenTypes and Applications entities.

ScreenSignatures—the inner representation of a screen is needed for effective capturing of the current state within the phone's application. This entity represents n:m relationship between screens and phones entities.

InputFormats—capturing format (e.g. Boolean, integer).

InputElements—screen elements (e.g. text, button, checkBox).

InputTypes—types of user input options (e.g. keyBoard, touchScreen).

Inputs—generic input elements, encompasses inputElement, inputFormat and inputType. This entity has n:1 relationships with each of: InputTypes, InputElements and InputFormats entities.

ScreenInputElements—screen inputs that relate to a specific screen. This entity has n:1 relationships with Screens and Inputs entities.

Goals—the goals that the application enables users to achieve. Goals includes also sub goals (tasks).

GoalScreenInputElementes—linkage between ScreenInputElements and goals. This entity represents the n:m relationship between Goals and ScreenInputElements entities.

Help—help text message.

HelpUserType—linkage between help suggestions and user types. This entity represents a n:m relationship between Help and UserTypes entities.

GoalHelpUserType—linkage between goals and helpUserType. This entity represents a n:m relationship between Goals and HelpUserTypes entities.

Following are examples of entities belong to the active TM:

UserSessionData—represent user activities within a screen. This entity represents a n:m relationship between SessionEvents and ScreenInputElements entities.

SessionEvents—represents events of screen's transition. This entity has n:1 relationships with Users, ScreenInputElements, UserSessionData and Screens entities.

Users—Users' characteristics as defined in a user model schema, which is separate from the TM described here.

UserType—User types that are determined based on the users' activities and characteristics. This entity too is separate from the TM described here.

The TM is defined using the DM designer tool 111 where each goal can be represented in one or more diagrams. This means that if a goal consists of many screen transitions, it can be divided to several diagrams where each diagram will hold only partial flow of the goal. The TM diagrams 300 include model entities that can be either new or reused, bases on already existing entities. For this end, the modeling tool has an import feature, which enables to upload an existing entity from the passive TM DB when creating a new diagram.

The process of creating the TM according to this embodiment consists of two stages: In the first stage, a static model is built. In the static model the desired application is described according to the goals that the application provides. For each goal, a detailed description is written (e.g. via Word or Visio) in a document which elaborate the goal elements. The goal elements include for example, goal name, screens, SIEs, and transition between Screens. Each SIE is defined with its input parameters (i.e. inputElement, inputFormat and inputType). Then the Goals' hierarchy is defined by creating relationships between goals and their sub-goals. Finally, the ScreenInputElements hierarchy is described (e.g. screenInputElement that opens a menu of screenInputElements).

In the second stage, based on the documents that were created in the first stage, a dynamic model is built. This stage is based on the assumption that the relevant phone, model, category, inputTypes, inputFormats, inputElements and screenTypes entities already exist; the TM designer does not provide capabilities to define these entities. The dynamic model is generated by tracking the use of the application screens over an actual device. For each defined element a name is provided. However, its ID is given automatically by the TM designer. The screen ID according to one embodiment is the screen signature. Once the diagram is completed it is exported to the passive TM DB. All the application's defined elements are presented in the Canvas 202 of FIG. 2 with their correspondent properties and relationships. Then, a validation process checking the consistency of the entities and properties in the diagram is carried out. If the checking succeeds, the diagram is exported, i.e., stored in the passive TM DB. According to one embodiment, the second stage includes the following steps:

Create a new task diagram.
Import the relevant Model entity.

Create or import an existing Application (if it is the first goal of the application, a new application should be identified, including its category).

For each Screen in the Goal build a Screen entity in the diagram, including its screenType.

Build a Goal entity in the diagram.

In each Screen define its ScreenInputElements and their properties (InputType, InputElement and InputFormat.

Define transitions between Screens that are caused by the relevant ScreenInputElements. (The linkage is between ScreenInputElements and Screens).

If the Goal includes several sub-goals, define them as Goals and define a linkage between the Goal and its sub-goals (the same holds for extending sub-goals to its sub-goals).

If exist, define hierarchy between ScreenInputElements.

Link the ScreenInputElements to their Goals.

If the Goal description includes many Screens, ScreenInputElements and transitions define in the diagram that describes the linkage between the Screens, including their Goals and build a separate diagram for each Screen that describes its ScreenInputElements that do not cause screen transition. In diagrams that use already defined entities the Import functionality should be used.

Upon completion of building the meta-model, a validation process regarding the current diagram should be carried out; and if it passes successfully, the current diagram is exported to the passive TM DB.

Develop part of the application.

The TM designer tool facilitates the applications' TM developed and provides generic modeling of future TMs. The application is modeled in an iterative process by splitting the application to several diagrams where each diagram handles only one or several goals. In addition, these diagrams can refer to already defined entities that exist in the passive TM DB, due to the import feature that was described above. Due to the iterative capabilities of the TM designer tool developers can collaborate and model simultaneously different parts of the application.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for modeling interactive sequential applications for smart mobile devices, comprising the steps of:
   a) generating in a central processing unit (CPU) a static model describing all goals of target applications using their screens, Screen Input Elements (SIEs), transitions between screens, sub-goals and the links between them;
   b) building in said CPU a dynamic model based on said static model by tracking the use of the application screens over an actual device while using an inheritance mechanism whereby model entities having a parent-child relationship are reusable in different models;
   c) creating instances of said static and dynamic models specifically generated for a variety of devices;
   d) storing said static and dynamic models with their instances into a passive Task Model database, being in data communication with said CPU;
   e) downloading relevant passive Task Models to user's device according its type and the application supported by said user's device;
   f) tracking in real-time user's actions during user-system interactions and generating a unique identifier for each application's screen that is visited by the user of said mobile device by choosing an identifier that matches a signature of each application's screen, wherein created identifiers are used for generating an active model of the user's actual usage;
   g) storing said tracked model into an active Task Model database being in data communication with said CPU; and
   h) comparing said active Task Model to said passive Task Model and generating usage patterns for said user;
   wherein the static and dynamic models are in the form of an Entity Relationship Diagram (ERD), and implemented in a relational database.

2. The method according to claim 1, further comprising verifying the screen identifier before storing in active Task Model database for validating the tracking.

3. The method according to claim 1, further comprising offering the client real-time help, marketing and content determined by the provider, based on the tracked data and relevant passive Task Models downloaded to client's device.

4. The method according to claim 1, further comprising analyzing data by comparing said passive and active databases, for generating an output database that comprises usage patterns, error patterns, user's intention prediction, market trends, and usability hotspots (problems) in addition to graphs and reports for helping providers realizing customers' activities and behavior.

5. The method according to claim 1, wherein each of the model entities is associated with a unique primary identifier and with a base identifier, said base identifier being derivable from a parent entity when said parent entity is reused by a given model entity and being identical to said primary identifier when said given model entity is a parent entity.

6. The method according to claim 5, wherein the parent entity is changed when reused by the given model entity.

7. The method according to claim 6, wherein data of the parent entity is overridden by the given model entity.

8. A system for task modeling interactive sequential applications for one or more mobile devices, comprising:
   a) a central processing unit (CPU) having a software tool for defining a generic meta-model of the target applications, wherein said generic meta-model consists of a static model of application components, and a dynamic model of identifiers of application screens and connections that are based on an inheritance mechanism whereby model entities having a parent-child relationship are reusable in different models;
   b) a passive Task Model database, being in data communication with said CPU, for storing said generic meta-model for future reuse, which further comprises static instances of the generic meta-model specifically generated for a variety of mobile devices;
   c) a tracker module in said processing unit for:
      c1) real-time tracking and monitoring user's actions during user-system interactions and creating a screen unique identifier for each application's screen visited by the user of said mobile device by choosing an identifier that matches a signature of each application's screen, wherein created identifiers are used for generating active models of the user's actual usage; and
      c2) generating a unique identifier for each captured screen that is presented to said user;
   d) an active Task Model database, being in data communication with said processing unit, for storing said active model, wherein data transferring and storing is minimized to screen unique identifier and;

e) an analyzer for comparing said active Task Model to said passive Task Model and for generating usage patterns for said user.

9. The system according to claim 8, wherein the mobile device is a smart mobile phone.

10. The system according to claim 8, wherein the screen identifier number is the screen signature.

11. The system according to claim 8, wherein the mobile device further comprises a real-time recommender engine, for offering the client real-time help, marketing and content determined by the provider.

12. The system according to claim 11, wherein the real-time recommendation is based on the tracked data and relevant passive Task Models downloaded to the mobile device.

13. The system according to claim 8, further comprising an analyzer that receives data from both the passive and active databases and compares said databases for generating an output database.

14. The system according to claim 13, wherein the output database comprises usage patterns, error patterns, user's intention prediction, market trends, and usability problems, in addition to graphs and reports for helping providers realizing customers' activities and behavior.

15. The system according to claim 8, wherein each of the model entities is associated with a unique primary identifier and with a base identifier, said base identifier being derivable from a parent entity when said parent entity is reused by a given model entity and being identical to said primary identifier when said given model entity is a parent entity.

* * * * *